United States Patent [19]

Fort et al.

[11] 3,881,166

[45] Apr. 29, 1975

[54] DATA ARRAY NETWORK SYSTEMS

[75] Inventors: J. Robert Fort; James A. Westphal, both of Altadena; Donald R. Juilfs, Chatsworth, all of Calif.

[73] Assignee: Geophysical Systems Corporation, Pasadena, Calif.

[22] Filed: May 7, 1973

[21] Appl. No.: 358,097

[52] U.S. Cl. ........................ 340/15.5 TS; 340/172.5
[51] Int. Cl. ................................................ G01v 1/34
[58] Field of Search ................ 340/15.5, 155, 172.5; 346/33 C; 179/15 AL; 235/151.35

[56] References Cited

UNITED STATES PATENTS

| | | | |
|---|---|---|---|
| 2,906,996 | 9/1959 | Bachelet et al. | 340/155 |
| 3,237,164 | 2/1966 | Evans | 340/155 |
| 3,651,474 | 3/1972 | Liberman | 340/172.5 |
| 3,652,979 | 3/1972 | Angelle | 340/15.5 MC |
| 3,723,971 | 3/1973 | Betts et al. | 179/15 AL |
| 3,748,638 | 7/1973 | Montgomery, Jr. et al. | 340/15.5 TS |

*Primary Examiner*—Harvey E. Springborn
*Assistant Examiner*—Michael Sachs

[57] ABSTRACT

This abstract describes a system for the field recording of seismic data in which a large plurality of geophones are divided into groups and each group is connected to an array terminal. All of the array terminals are connected in series, by cables, with the last terminal connected to a recording unit. In each of the terminals there are means to process the geophone analog signals by amplifying and adding them to a selected shifting function, and axis-crossing-coding (AXC) the resulting sum signals to provide a plurality of pulses which are stored in a parallel-to-serial converter. In addition, each of the terminals contains a buffer register. On command from the recording unit the bits stored in the converters are read out in series and are transmitted by a pair of signal conductors to the next in series terminal for storage in the buffer register, and from there to the buffer register in the next in series terminal, and so on, until all of the bits stored in each of the terminals are transmitted as a continuing train of single bit signals to the recording unit, where they are recorded on a magnetic disc.

Each of the array terminals has a hard wired address code which is transmitted as a heading to the data stored in that converter. Logic circuit means are provided to identify, for each terminal, which of the plurality of cable ports in the terminal are occupied by cables, and which of the cable ports is the one by means of which the commands are received from the recording unit.

13 Claims, 6 Drawing Figures

DATA ARRAY NETWORK SYSTEMS

CROSS REFERENCE TO RELATED APPLICATIONS

This application is related to three other applications assigned to the same assignee as this application and filed on the same date May 7, 1973 as this application. The titles of the other three applications are as follows: DATA ACQUISITION TRANSPORT AND STORAGE SYSTEM Ser. No. 358,077; DATA COMPOSITING AND ARRAY CONTROL SYSTEM Ser. No. 358,078; and DATA ACQUISITION AND PROCESSING SYSTEM Ser. No. 358,076.

DEFINITIONS

In this application a shifting function is defined as any time function, which when added to an analog signal causes a shift of the axis crossing times of the sum signal of the analog signal and the shifting function. Examples of shifting functions are noise, sinusoids, sawtooth time functions and so on. In this application the shifting functions may be random in at least one parameter, such as frequency, or phase, for example, and may be the sum of a plurality of shifting functions. In general, the shifting functions will be amplitude controlled in relation to the analog signals to which they are added.

For the purpose of this application the terms: recording unit, recording truck, recording boat, recorder, will mean the location of the array controller and the magnetic digital recording means.

The magnetic recording means will be a controlled magnetic recording disc or drum, or other clock controlled magnetic recording means.

The terms detectors, geophones, sensors, transducers will means the devices which provide the analog signals which are entered into the acquisition system of this invention.

In the acquisition system of this invention there may be one or more recording channels each with one or more detectors connected thereto.

While this invention is most applicable to a multichannel acquisition system, and while it is contemplated that digital signals from each channel will be transmitted in sequence to the recording unit over a single conductor pair, it is contemplated that this signal transmission can be any selected telemetering channel, including an electromagnetic radiation channel such as radio, or laser, or elastic wave channels such as in solids, liquids, or gases.

BACKGROUND OF THE INVENTION

This invention is in the field of data acquisition systems. More particularly, it is in the field of data gathering systems which involve a high plurality of separate detectors and channels, the signals from which are carried to the data storage means by a single pair of conductors. This system is ideally suited for use in seismic geophysical prospecting.

While this invention is useful in the acquisition of any type of analog signals such as in the field of data collection, vibration analysis, sonar signaling, nuclear technology, and so on, it is most appropriately useful in the area of seismic prospecting and as a matter of convenience will be discussed in that application. This description in terms of a seismic system does not limit in any way the scope of this application and its use in other fields of data acquisition.

In the prior art, seismic operations have been carried out with field instrumentation systems which have, in general, been limited by size, weight and power requirements to 24–48 separate recording channels. Additional recording channels have been provided by the process of adding additional recording truck units, and so on. Although there have been suggestions in the technical press for multiplex recording systems whereby high pluralities of recording channels can be provided using a single conductor pair for the transmission of the separate traces there have been no practical ways shown for carrying out such suggestions. Furthermore, those that have been suggested call for control and processing devices in series with each signal channel at considerable complexity and cost.

SUMMARY OF THE INVENTION

It is a primary object of this invention to provide a system of data acquisition, and to provide a network of terminals for the acquisition, processing, and transmission of a large plurality of independent analog signals derived from a corresponding plurality of detectors spaced in a two dimensional array. It is a further object of this invention to provide means by which this large number of independent channels can be broken up into groups which are connected into a plurality of terminals and to provide means by which the sequence of data signals transmitted to the recording unit can be identified in terms of a specific array terminal and a specific channel in that terminal.

These and other objects are realized and the limitations of the prior art are overcome in this invention, which permits the operation of recording units in the field with a large number (such as 250 to 1,000) of separate recording channels all of which are multiplexed onto a single pair of conductors. This is accomplished by having a plurality of array terminals. These are data coding units which are designed to handle a selected number of recording traces, such as 16, for example.

Each array terminal has a housing out of which are provided the 16 separate conductor pairs, of selected length, each connected to at least one geophone, so that the geophones can be arrayed in a selected spatial pattern on the earth.

There may be a large plurality of array terminals, all essentially identical in construction. These can be placed in any geometrical relation on the earth and interconnected by substantially identical multiple-conductor cable units. Each of the cable units includes signal conductors, power conductors and control conductors. Eachof the array terminals has a plurality of input-output ports. There may be, for example, four of these ports, arranged on the four sides of a rectangular chamber, or housing. The arrangement of the ports is such as to facilitate interconnecting separate array terminals. For example, if all array terminals are in series an input cable can be connected to one port and the output cable would be connected at the third port counting in a clockwise direction from the input as the first port. If there are to be two cross lines, these would be connected into the array terminal at the second and fourth ports, for example.

Each of the array terminals has a logic network inside, arranged so that signals coming in on the control conductors can interrogate the first terminal, that is, the one into which the cable from the truck is connected. Upon interrogation, the logic network will transmit back to the truck, a coded signal which indicates, in sequential order, which of its ports are in use and which port is connected to the recording unit. It will then transmit to the next terminal, that is, through the cable which is connected next in sequential clockwise order, and will pass on the interrogation from the truck to the second in series array terminal. The second array terminal will then transmit its coded signal, indicative of the cable connection into the several ports of the second array terminal. This coded signal comes back to the first terminal, and it is then repeated back to the recording unit, and so on. By this means a complete picture, in terms of coded signals, is recorded at the recording truck, which shows the connection diagram (so to speak) of each of the array terminals and the sequence in which each of them responds to an interrogation from the truck.

The manner in which the seismic signals produced by the geophone are multiplexed and transmitted to the truck is described in a companion application filed on the same date as this application and titled "DATA ACQUISITION TRANSPORT AND STORAGE SYSTEM Ser. No. 358,077."

In this system each array terminal receives an interrogation from the truck, answers it, then repeats the interrogation through to the second terminal, which answers it and passes it onto a third one, and so on. Similarly, the answers from succeeding series-connected terminals are received and repeated back to the truck. By this means the data signals which are short duration square wave pulses, or bits, are restructed at each repetition into new square wave pulses, and therefore, since the transmission between separate array terminals and between the first array terminal and the truck are relatively short cable lengths, these signals can be transmitted on conventional cable conductors. Therefore, the complexity of handling plugs and connections to coaxial cables, as previously suggested in the art, is not necessary in practicing this invention.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENTS

This information acquisition and transmission system is ideally suited for gathering time function information from a plurality of distributed locations, processing these into the form of axis-crossing-coded signals, that can be multiplexed from the entire plurality of separate channels onto a two conductor cable into the storage device. While this type of system can be used for any type of analog signals it is ideally suited for a seismic geophysical system and will be described in terms of such a system. However, the description of this invention in terms of a seismic system is purely coincidental and there are no limitations to the use of this system intended by a description in this manner.

Figure 1:
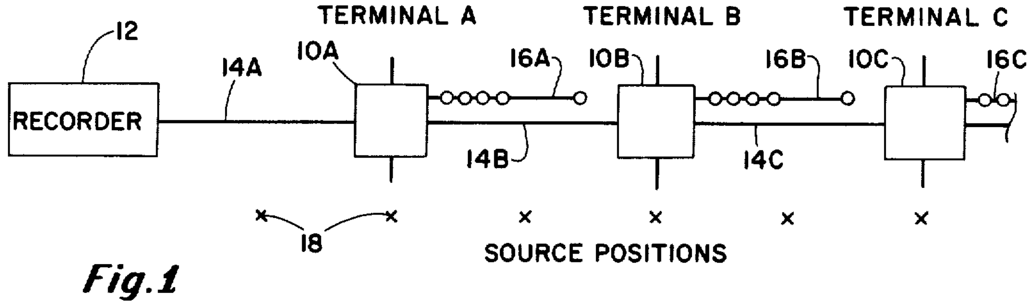
FIGS. 1, 2 and 3 represent possible areal distributions of array terminals and geophones.
Figure 2:
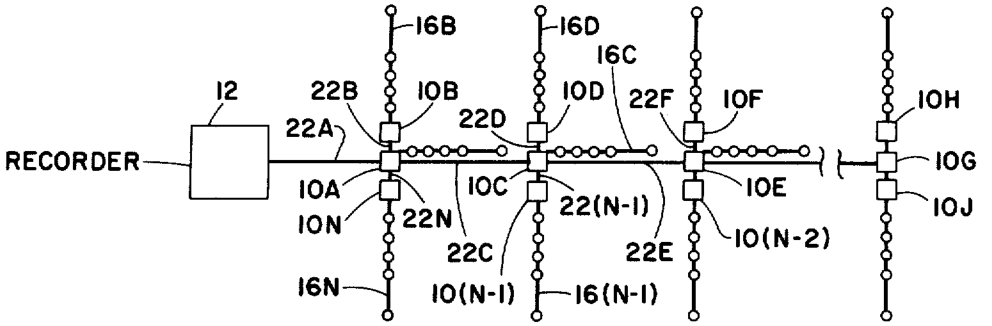
Figure 3:
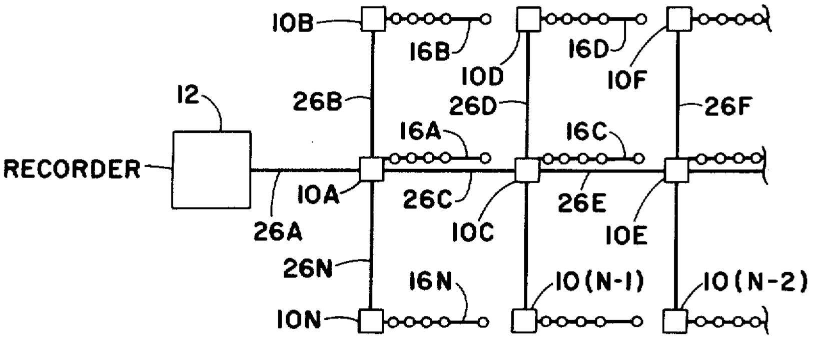

Referring now to the drawings and in particular to FIGS. 1, 2 and 3, there are shown several geometrical arrays in which the plurality of array terminals and geophone cables can be placed. In FIG. 1 recording unit or recording truck 12 is shown connected by cable 14A to the first terminal 10A, which is connected to the second terminal 10B, by cable 14B, and that is connected to the third terminal 10C, by means of cable 14C, and so on. Each terminal has a plurality of geophone conductors and geophones connected thereto, which are labeled 16A, 16B, 16C and so on. Although the geophone cable 16A can have as many separate geophones per channel as desired, there should be, of course, at least one geophone per conductor pair. In general, the spacing between individual geophones will be of a selected distance, such as 40 feet, for example, in which case the spacing between array terminals will be approximately 15 times this, or 600 feet. The system is best adapted to be used with a roll along operating system, in which the source points, or vibrator positions, in case of a vibroseis system, are indicated at the X marks 18. These are placed approximately 300 feet apart or half the terminal spacing.

In FIGS. 2 and 3 are shown two other geometrical arrays in which the four ports of each of the in-line array terminals are utilized to provide crosslines at each point. For example, in FIG. 2 the first array terminal 10A has an input cable 22A from the truck 12, a cable 22B going north to the array terminal 10B. The geophone cable 16B from the second array terminal is directed at right angles to the line of survey, represented by cables 22A, 22C, 22E and so on. Similarly, the third port of array terminal 10A is connected by cable 22C to the third array terminal 10C. This has a cable going north to the fourth array terminal 10D, and so on, until the end position is reached which is terminal 10G. This is then connected to 10H to the north and terminal 10J to the south. Then going back towards the recorder, terminal 10E is connected to terminal 10(N-2), terminal 10C is connected to the south to terminal 10(N-1) and terminal 10A is connected to the south to terminal 10N.

FIG. 3 illustrates a similar array of terminals, but the side terminal such as 10B, 10D, 10F and 10N, etc. are spaced apart by the full length of the interconnecting cables 26B, 26D, 26N, etc. In FIG. 3 there are three parallellines of geophones. It is easy to see, of course, that any geometrical two dimensional array of geophones can be obtained by this system of array terminals.

Figure 4:
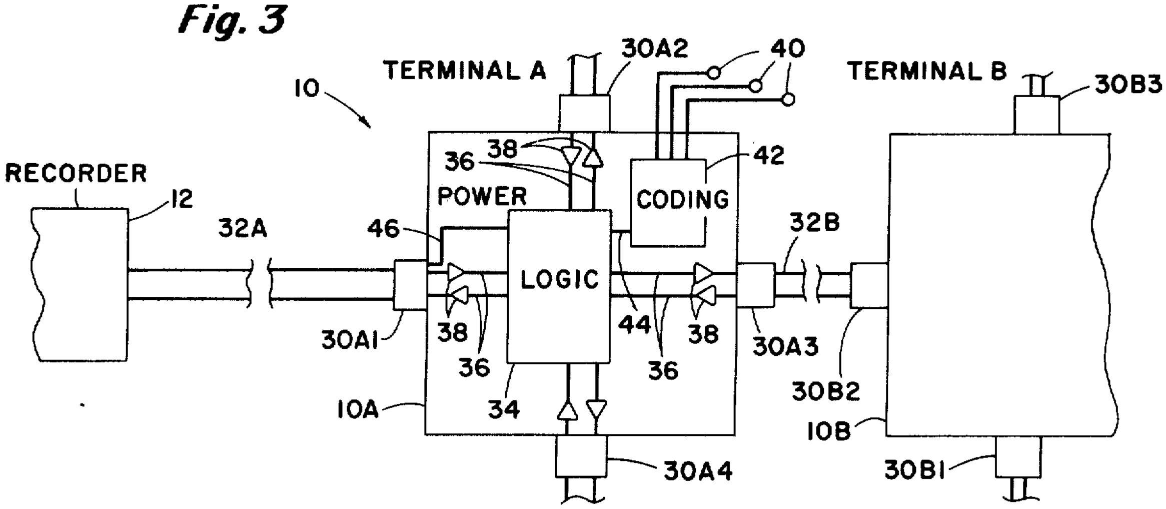
FIG. 4 represents schematically the logic operations of the array terminal.

Referring to FIG. 4 there is a schematic diagram of the circuit arrangements in each of the array terminals such as 10A, for example. There are shown four ports to this array terminal, 30A1, 30A2, 30A3, 30A4, in clockwise order. As shown by the amplifiers 38 to leads 36 at each of the four ports, data and/or control signals can come in through the port on one pair of conductors and go out through the port on another pair of conductors, from the logic system 34, which will be described in detail in connection with FIG. 5. There may be a number of control conductor pairs. Power is provided on additional conductors such as 46 which are powered at the recorder, and go to the logic box and provide the necessary operating voltages for the logic elements.

There is also the geophone coding system 42 in the array terminal, which is connected to the logic box, so that signals can be delivered from the geophone coding box to the logic box to be transmitted to the recorder, for example. The geophone coding box 42 will be described in greater detail in connection with FIG. 5.

Figure 5:
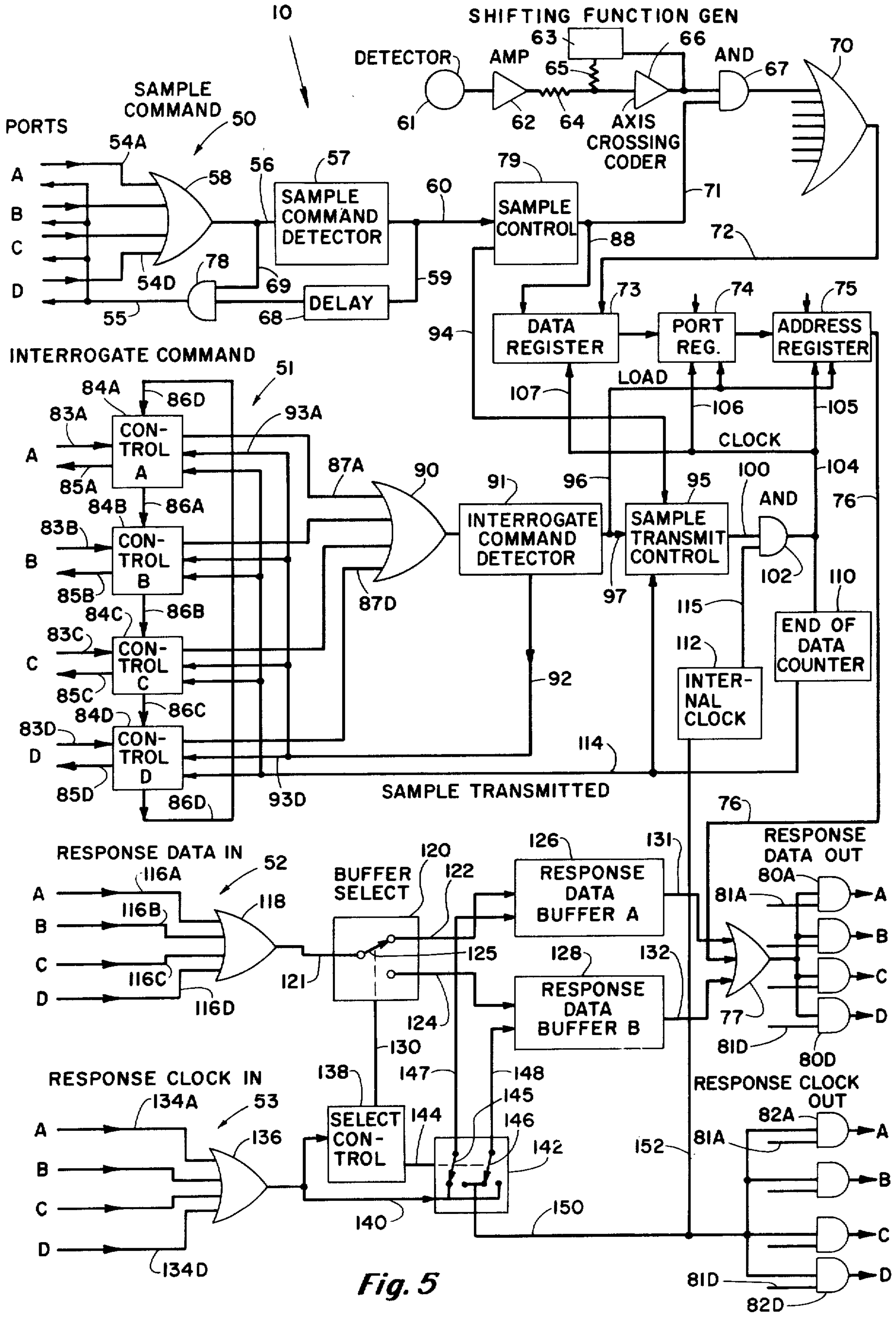
FIG. 5 shows detailed circuits for the logic in the array terminals.

Referring to FIG. 5 there is shown in greater detail the schematic diagram of a typical terminal such as shown by the numerals 10. As indicated previously there are a plurality of ports which will be numbered A, B, C, and D. Although four ports have been shown, any number greater than one can be used. These have provisions for connection of a multiconductor cable. One cable at one port will be connected in the direction of the recording unit and another cable in another port will be connected to a succeeding terminal in a series array of terminals.

There are three principal activities carried out in the array terminal. a. First there is a provision for receiving analog signals from detectors such as geophones and for processing these signals into digital bits, and on command, to convert the analog signals to a train of digital bits for storage in a register or buffer.

b. The second part of the diagram covers a sample command system in which a command can be received from the recording unit on the incoming cable which may be on any one of the plurality of ports. This is a command a sample the plurality of processed analog signals, convert them to digital pulses and to store them in a parallel-to-serial converter.

c. The third part of the system is in an interrogation command system which calls for a coded signal from each terminal giving a coded address of the terminal, and describing the ports, and which ports have cables connected to them, and also which of the plurality of ports is the source port, that is, which of the ports is the one that receives the command from the next preceding terminal, or the recording unit.

Once these coded signals ar generated, the next opertion following the interrogation command is to transmit the local address code of the terminal, the port coded signal, and the digital data stored in the parallel-to-serial converter and to transmit them onto the next succeeding terminal for storage in a buffer register. At the same time, corresponding address, port, and data information are received from the next preceding terminal and these are stored in a buffer register. As soon as the first address and data are transmitted to the next succeeding terminal in the direction toward the recording units, and so on.

There are many good text books on computers and similar digital electronic apparatus which fully describe these basic system elements and teach how they may be used. One such text is "Digital Computer Design Fundamentals" by Y. Chu, McGraw Hill Book Co., New York, N. Y. 1962. Another is "Digital Computer Design" by E. L. Braun, Academic Press, 1963.

In FIG. 5 starting at the top there is shown a sample channel comprising a detector 61 connected to an amplifier 62, a shifting function generator 63, and resistor adding means 64, 65, to provide a sum signal which goes to an axis-crossing-coder 66.

There are a plurality of M channels similar to the one just described. This channel is of special design, which is fully described in the copending application Data Acquisition Transport and Storage System. It is uniquely suited to this data array network system, since the analog signals are modified and coded to zero-crossing-coded pulses, which can be conveniently transported on a two conductor cable. However, this invention is not limited to the particular system described briefly above, and more fully in the copending application, but can be used with any analong signal acquisition system, which includes the conversion of the analog signals to digital signals, which can be transmitted in serial train form to a recording unit.

There is a sample command channel which is essentially an OR gate 58 which receives incoming signals on any one of leads 54A, 54B, ...54D from the four ports labeled A, B, C and D. No matter from which port the sample command arrives, it will go through the OR gate 58 to lead 56 to sample command detector 57. The purpose of the detector 57 is to ensure that the voltage step, which is the command signal, and which is detected on one of the sample command input leads 54, is a true signal. To be a true command signal it must last for a selected period of time say 16 microseconds. Whether it does, or does not, is determined by a counting means operated by a clock so that if that voltage is still present on the line 56 to the sample command detector at the end of 16 microseconds it is identified as a true command.

Reference is made in Braun, pages 114, 115 to multiplexers. See also Chu, pages 122–124 on Delay and Sequential Functions, and pages 368–369 for data buffers.

The AND gate 78 has its two inputs connected to the lines 56 and 60. When the step voltage appears on line 56 the gate 78 is enabled and than at the end of the sixteen microseconds, when a positive voltage appears on line 60 this is transferred to leads 59 and delay element 68 to the gate 78, which puts out a positive signal on lead 55 which goes to the "out" leads of each of the four ports.

While this apparatus is being described in terms of four ports for each of the terminals, the number can be any number desired, and will be described for convenience in terms of the four ports.

At the end of the sixteen microsecond count the positive voltage appears on lead 60 and goes to the sample control 79. This is a multiplexing device which puts a positive voltage on lead 71 going to each of the AND gates 67 on each of the signal channels. The axis-crossing-coded signals, or pulses, passed by gate 67 go through the OR gate 70 via lead 72 to a data register 73, and they are controlled in sequence by the lead 88 from the sample control, so that each of the M pulses from the M channels are stored in parallel in the data register 73 or parallel-to-serial converter.

Reviewing now, on sample command, a voltage appears on any one of the input leads on any one of the ports and goes to a sample command detector, which determines that it is a true signal command. The signal then goes to the sample control which causes the axis-crossing-coder 66 to put out a serial train of bits corresponding, one bit, to each of the M channels, and these are stored in the register 73.

The next operation is an interrogate command which comes from the recording unit. Again this can come in on any one of the input leads on any one of the four ports. Like the sample command it is also a voltage step which must last for at least sixteen microseconds. At least one of the lead 87A to 87D in the four ports, will carry an interrogate command signal to the OR gate 90 to the interrogate command detector 91. Here again, like the sample command detector, the voltage must remain for at least sixteen microseconds to be detected as a true command. When the command is determined to be a true command, a voltage is placed on lead 97 to the sample transmit control 95. This enables an AND gate 102 through lead 100. This permits a clock 112 connected to the AND gate by line 115 to put out voltage pulses on lead 104. This provides clock pulses to the address register 75 by lead 105, the port register 74 by lead 106 and the data register by lead 107. The clock 112 has control of all buffering and reading out of digital signals.

The first step on the interrogate command after it is determined to be a true command by the detector 91, is to cause the address register to read in a series of bits which represents the address code of this particular terminal. Also as will be explained in connection with FIG. 6, a coded signal is impressed on the port register 74 which tells which of the four ports have cables connected and which of the four ports is the source port, that is, the one that leads toward the recording unit, and on which the commands arrive. Now the three registers 75, 74 and 73 are loaded and ready to transmit. The sample transmit control 95 puts out the signal to transmit, and causes the data bits stored in the three registers 75, 74 and 73 to flow by way of lead 76 through the OR gate 77 and out through one of the four ports A, B, C, D through one of gates 80A, 80B, ...80D. Only one of these gates will be enabled by the leads 81A to 81D, and this is done in accordance with which of the ports A, B, C, D is determined to be the source port. This will be described in connection with FIG. 6. Knowing which port receives the command signal from the recording unit, the data are fed out through that same port on the Response Data Out leads.

All of the terminals are connected in series so that one will recieve the command directly from the recroding unit and it will transmit it by a second cable to a second terminal which will receive the command and transmit it to a third terminal, and so on. On the transmission of data toward the recording units the direction of transmission is opposite but that is no concern of the terminal because the data are fed out from the terminal through the same port on which the command came in, that is, through the source port.

Farther down on FIG. 5 there is a group of leads 116A, 116B, 116D, called response data in. On one of these, digital data will be received from the next in series outwardly from the recording unit. In other words, all of the terminals are given the sample command simultaneously and the data register 73 in each of them is filled. Then on the interrogate command, the data from the registers 73, 74, 75 are transmitted out through the response data out line toward the next terminal in the direction toward the recording unit. All of these data transmissions go simultaneously from one terminal to the next, from that to the next and so on until the last terminal sends it directly to the recording unit.

The data are read out of a given terminal in accordance with a clock in that terminal and that clock is also transmitted to a parallel set of leads called the Response Clock Out, so that the next succeeding terminal will receive the data and clock pulses simultaneously. Thus, the data can be stored in a register in that next terminal at exactly the same rate it is read out of the previous terminal and transmitted. Thus the response data and response clock must be transmitted together.

It is an important part of this invention that the data are transmitted as groups from one terminal to the other. They are received from previous terminals into one of two response data buffers 126 and 128. Data coming in through the Response Data In leads 116 and OR gate 118 are sent into one buffer or the other, depending upon which is empty at the moment. Assume that the buffer select switch 120 is set to as to connect lead 121 through switch 125 to lead 122 to the response data buffer 126. At the same time the clock lead 147 which serves buffer 126 will be connected through switch 145 and lead 140 to the Response Clock In lead 134. Thus data coming in on, let us say, port A, that is, lead 116A, will go to buffer 126 and will be clocked in at a rate determined by the response clock coming in on lead 134A, which is the clock of the preceding terminal, the data loaded in the previous cycle and stored in response data buffer 128, is read out on line 132 at a rate set by the clock 112, through its lead 152 through lead 150 through switch 146 and 148. Thus the data stored in buffer 128 goes through the OR gate 77 through the appropriate response data out lead, that is, through the port which has been determined to be the source port. Also the internal clock 112 goes by lead 152 to the response clock out lead of that same source port.

On the next cycle the response buffer 128 is loaded by the incoming response data and the data previously loaded in buffer 126 is then read out on line 131, through OR gate 77, through the proper response data out line.

Figure 6:
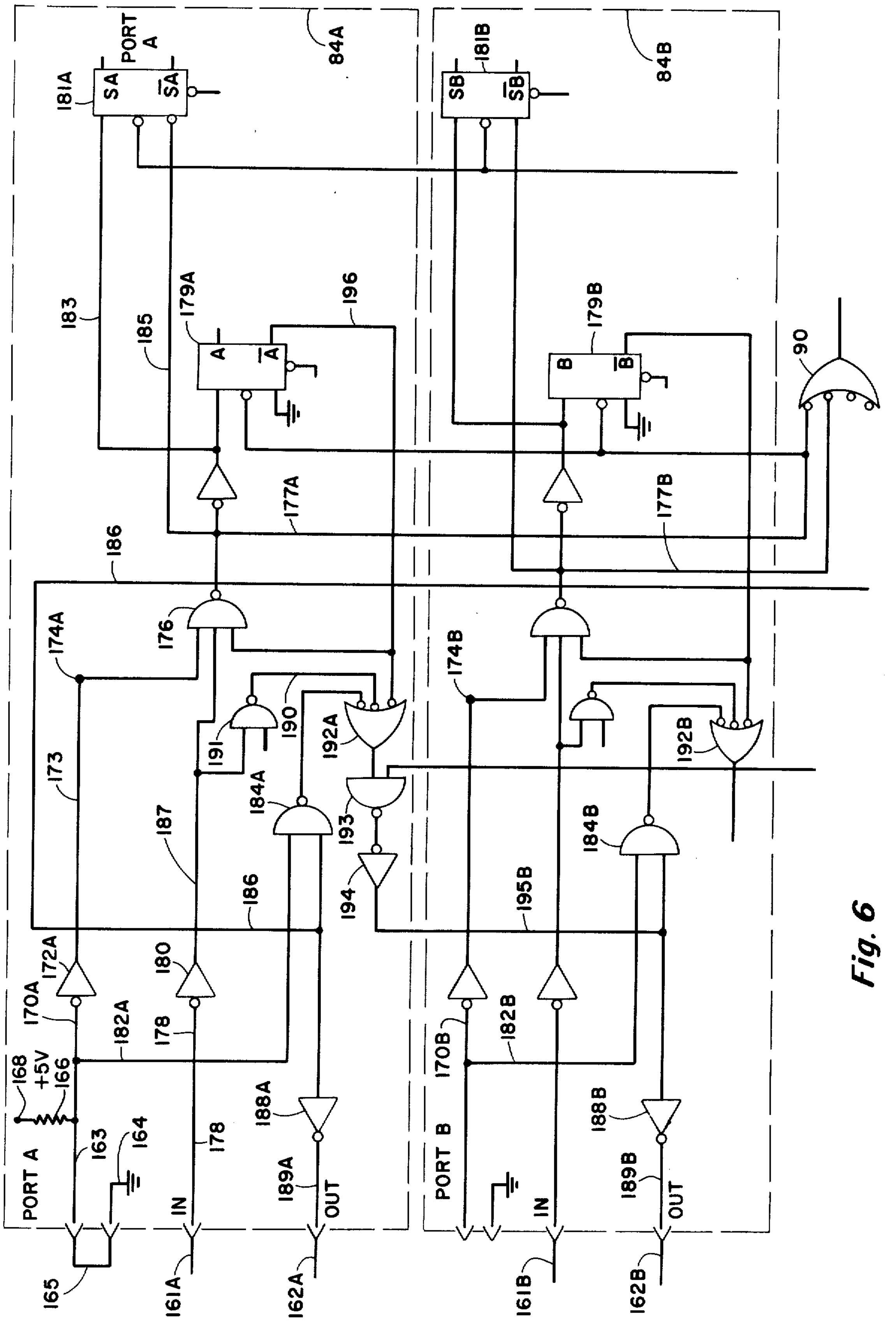
FIG. 6 shows in still greater detail part of the interrogate command system.

Referring now to FIG. 6 there is shown in some additional detail the control circuitry. Dashed outline 84A represents port A and dashed outline 84B represents the corresponding port B of the interrogate command circuit. Assume that port A is the source port, and interrogation commands arrive on lead 161A, and go through an inverter 180 to an AND gate 176. The interrogation signal is a negative step which is inverted by the inverter 180 to put a positive voltage on the AND gate 176. There are two additional contracts on the plug at each port such as A, these are identified as 163 and 164. On the cable side of the plug there is just a short circuit 165, so that when a plug is connected to port A, lead 163 and 164 will be shorted together by lead 165. Normally the potential of lead 163 is held to plus 5 volts by the potential 168, through resistor 166. The lead 164 is connected to ground. When a cable is plugged into port A the lead 163 is grounded, placing zero voltage on lead 170 going to inverter 172A, which makes a plus voltage on 173 and this goes by lead 175 to the AND gate 176 which was enabled by the incoming signal on 161A. This causes a voltage to be applied to lead 177A to the OR gate 90, and this goes to the interrogation command detector 91 as previously described in connection with FIG. 5. Also the plus voltage on lead 173 appears at terminal 174A and this plus voltage is an indication that there is a cable plugged into port A. In general there will always be at least one cable. There may be as many as four cables plugged into four ports, but only one of these can be a source port. The coded signal sent back to the recording unit tells both. That is, it tells which of the ports have cable connected and which one of the four ports is the source. So terminal 174 provides a plus voltage which indicates that port A has a cable. Similarly all four of the ports could have a plus voltage on the corresponding terminals 174B, 174C, etc.

In the remainder of the circuit there is a group of flip-flops 179A, 179B, etc. connected one to each of the terminals 174 (through gate 176). Once set, these flip-flops hold their potential until the read command is sent. There is a second group of flip-flops 181A, 181B, etc. which are enabled by the first group of flip-flops, that is, those that are controlled by a cable connection. The second group are called source flip-flops and only one of these will be set, that is, by the first port that receives an interrogation command. It will have had a cable connected and will show the positive voltage on 174 and will set the corresponding port flip-flop 179 and will then set the source flip-flop 181 which thereupon disables all of the other three source flip-flops. Only one source flip-flop will be set in each terminal. It is the signal from this source flip-flop 181 that determines which of the gates 80A, 80B, 80C, 80D or gates 82A, 82B, 82C, 82D (FIG. 5) are enabled so as to transmit the response data and response clock out.

On the interrogation command not only do the terminals communicate with each other serially and transmit their own data out, receive data in from a previous terminal, and transmit it out to the next terminal, and so on, but every command is passed on from one port to the other. For example in FIG. 6 consider that port A is the source port. A cable will be plugged into port A, therefore flip-flop 179A will be set and lead 196 will have a zero signal. This goes to gates 192, 193 and inverter 194 and places a plus signal on inverter 188B which places a negative voltage step on output lead 189B. This is the command signal, and goes by cable to the next terminal, if a cable is connected.

Assume that there is no cable connected to gate B. Thus there will be a plus voltage on lead 170B and 182B to AND gate 184B. The other lead to gate 184B is the lead 194 from port A which has a plus voltage. Thus gate 184B puts out a zero to gate 192B, which, as seen in connection with port A, will place a plus voltage on lead 195C at port C. If port C has a cable, the command signal will be transmitted out, and also it will be passed on to port D, and so on.

Very little has been said about the data processing of the input channels, shown at the top of FIG. 5. This processing can be of any desired type so long as the input analog signals are converted to digital signals that can be stored in the data register 73. However, this system of array terminals is ideally suited to a processing system in which the analog signals are amplified, added to a shifting function and zero-crossing-coded to provide a train of digital bits for storage in the parallel-to-serial converter. This is fully described in a copending application entitled: DATA ACQUISITION, TRANSMISSION AND STORAGE SYSTEM Ser. No. 358,077. Also, little has been said about the source of the commands and the storage of the transmitted bit signals. However, this is fully described in another copending application entitled: DATA COMPOSITING AND CONTROL SYSTEM Ser. No. 358,077.

While the coded signals have been described as being stored in parallel-to-serial converter means other types of digital storage means, well known in the art can, of course be used. Also, while the sample and interrogate command signals are described as voltage steps, other types of coded signals can be used.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A data gathering system comprising:

a. a plurality of N array terminals:

b. each array terminal having a plurality of P ports into each of which a multiple conductor cable can be connected, said multiple conductors comprising signal, clock and control conductors:

c. means, including a plurality of selected lengths of said cable to connect between ports in different array terminals, in series connection, and to connect the last in series of said terminals to array controller means:

d. means in said array controller means to signal said terminals, by a coded signal on said control conductors: and e. means in each of said terminals to respond by transmitting a coded signal indicative of whether a cable is or is not plugged into each of said ports in each of said terminals.

2. The system as in claim 1 including means to transmit power from said array controller to said terminals.

3. The system as in claim 1 including means in said array terminals to identify which of said P ports first receives an interrogation from said array controller.

4. A data gathering system comprising:

a. a plurality of N array terminals:

b. each array terminal having a plurality of M separate conductors means of selected lengths, each connected to at least one detector so that said detectors can be positioned in selected spaced relation to sense at least one physical parameter and to produce an analog signal indicative of said parameter:

c. each array terminal having a plurality of P ports into which a multiple conductor cable can be connected, said multiple conductors comprising signal, clock and control conductors:

d. means, including a plurality of selected lengths of said cable to connect said array terminals in series connection and to connect the last in series of said terminals to array controller means:

e. means in said array controller means to signal said terminals, by a coded signal on said control conductors:

f. a plurality of M analog signal coding means in each array terminal, each one in circuit with one of said detector means:

g. means to sample at selected time intervals each of said signal coding means, and to store said sampled coded signals in said array terminal; and h. means on command from said array controller means to readout and transmit said sampled coded signals stored in said array terminals, at second selected intervals of time to the next in series array terminal.

5. The system as in claim 4 in which said sampled coded signals are stored in parallel-to-serial converter means;

6. The system as in claim 4 including means to repeat said read out at said second selected intervals of time.

7. A data acquisition system comprising:

a. a plurality of N array terminals arranged in a spaced, geometric pattern, with one terminal positioned at each of N known locations:

b. a plurality of M detector means connected to each array terminal, each detector means sensing at least one physical parameter, and outputting an analog signal corresponding thereto:

c. means inside said terminals for modifying said analog signals and converting said modified analog signals to digital data signals and for storing same:

d. means for connecting said converter means in each of said terminals in serial operative connection; and e. means to sequentially read out said digital data signals in each of said plurality of converters in said plurality of terminals simultaneously from each of said terminals, by transmitting said signals each to the next in series terminal and storing them in said next in series terminal.

8. The system as in claim 7 in which said coded signals are stored in parallel-to-serial converter means.

9. The data acquisition system as in claim 7 including:

means in each terminal to provide a digital coded address signal indicative of the identity of said terminal, and to transmit said coded address signal as part of a heading for the digital data signals from that terminal.

10. The data acquisition system as in claim 7 including a plurality of ports in each terminal, and means to connect multiconductor cables into one or more of said ports, said cables connecting said terminals in serial connection, the port which first receives the command signals being the source port and including:

means in each terminal to generate a digital coded port signal indicative of which of said plurality of ports have cables connected thereto, and which of said plurality of ports is the source port; and means to transmit said coded port signal from each terminal as part of a heading for the digital data signals from each terminal.

11. A data acquisition system comprising:

a. a plurality of N spaced apart array terminals and means for collecting a plurality of M analog signals into each of said terminals:

b. means in each of said terminals for converting said analog signals to digital signals and storing same in parallel to serial converter means:

c. means to connect said parallel to serial converter means in each of said terminals in series operative connection and to connect said parallel to serial converter means in each of said terminals to the buffer register means in the next in series terminal, the last in series parallel to serial converter means connected to a data storage means in an array processor means:

d. means on first command to simultaneously transmit the stored digital data in each of said parallel to serial converter means to said buffer register means in the next in series terminal "to last in series said array processor data storage means."and e. means on second command to simultaneously transmit from the buffer register in each of said terminals the data stored therein to the buffer register in the next in series terminal "to last in series said array processor data storage means."

12. The system as in claim 11 including clock means in each terminal and means to read digital data into the buffer register in a selected terminal at the first rate of the clock in the preceding in series terminal, and to read out data from said buffer register at the second rate of the clock in said selected terminal.

13. The system as in claim 12 including in said selected terminal two buffer registers, and means to read in said data at said first clock rate into a first of said two buffer registers, while reading out data from the second buffer register at said second clock rate.

* * * * *